United States Patent
Smith

(10) Patent No.: US 7,762,631 B2
(45) Date of Patent: Jul. 27, 2010

(54) DISTRIBUTED POWER TRAIN OPERATION RESPONSIVE TO AN UNEXPECTED BRAKE PIPE FLUID FLOW CONDITION

(75) Inventor: Eugene A. Smith, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 1149 days.

(21) Appl. No.: 11/397,378

(22) Filed: Apr. 4, 2006

(65) Prior Publication Data

US 2007/0228813 A1    Oct. 4, 2007

(51) Int. Cl.
*B60T 13/00* (2006.01)

(52) U.S. Cl. .............................. 303/7; 303/15; 303/128; 701/19

(58) Field of Classification Search ............. 303/3, 303/7, 8, 9.61, 15, 128, 133, 66, 67, 68; 701/19, 701/20
See application file for complete search history.

(56) References Cited

U.S. PATENT DOCUMENTS

| | | | |
|---|---|---|---|
| 4,687,258 A | 8/1987 | Astley | |
| 5,039,038 A | 8/1991 | Nichols et al. | |
| 6,095,618 A | 8/2000 | Heneka et al. | |
| 6,314,345 B1 | 11/2001 | Coombes | |
| 6,375,275 B1 * | 4/2002 | Smith et al. ............ | 303/3 |
| 6,375,276 B1 | 4/2002 | Delaruelle | |
| 6,435,623 B1 | 8/2002 | Peltz | |
| 6,443,538 B1 * | 9/2002 | Smith et al. ............ | 303/128 |
| 6,824,226 B2 | 11/2004 | Smith, Jr. et al. | |
| 6,866,347 B2 | 3/2005 | Smith et al. | |
| 2002/0089232 A1 | 7/2002 | Smith, Jr. et al. | |
| 2003/0137191 A1 | 7/2003 | Smith, Jr. et al. | |
| 2005/0189815 A1 | 9/2005 | Bryant | |

FOREIGN PATENT DOCUMENTS

EP    0 976 633    2/2000

* cited by examiner

*Primary Examiner*—Thomas J Williams
(74) *Attorney, Agent, or Firm*—Robert Wawrzyn, Esq.; Terry M. Sanks, Esq.; Beusse Wolter Sanks Mora & Maire, P.A.

(57) ABSTRACT

A method of propagating a brake pipe braking command along a fluid carrying brake pipe (14) interconnecting members of a transportation system, the transportation system comprising a communication system (24) for exchanging information between a controlling member of the system and controlled members of the system includes identifying an unexpected brake pipe fluid flow condition at a first controlled member (e.g. 12) of the transportation system inconsistent with a communication system braking command issued by a controlling member of the transportation system. The method also includes disabling an ability of the first controlled member to control a brake pipe flow so that a brake pipe braking command issued by the controlling member is propagated along a brake pipe to a second controlled member of the transportation system downstream of the first controlled member with reduced brake pipe fluid flow interference from the first controlled member.

23 Claims, 1 Drawing Sheet

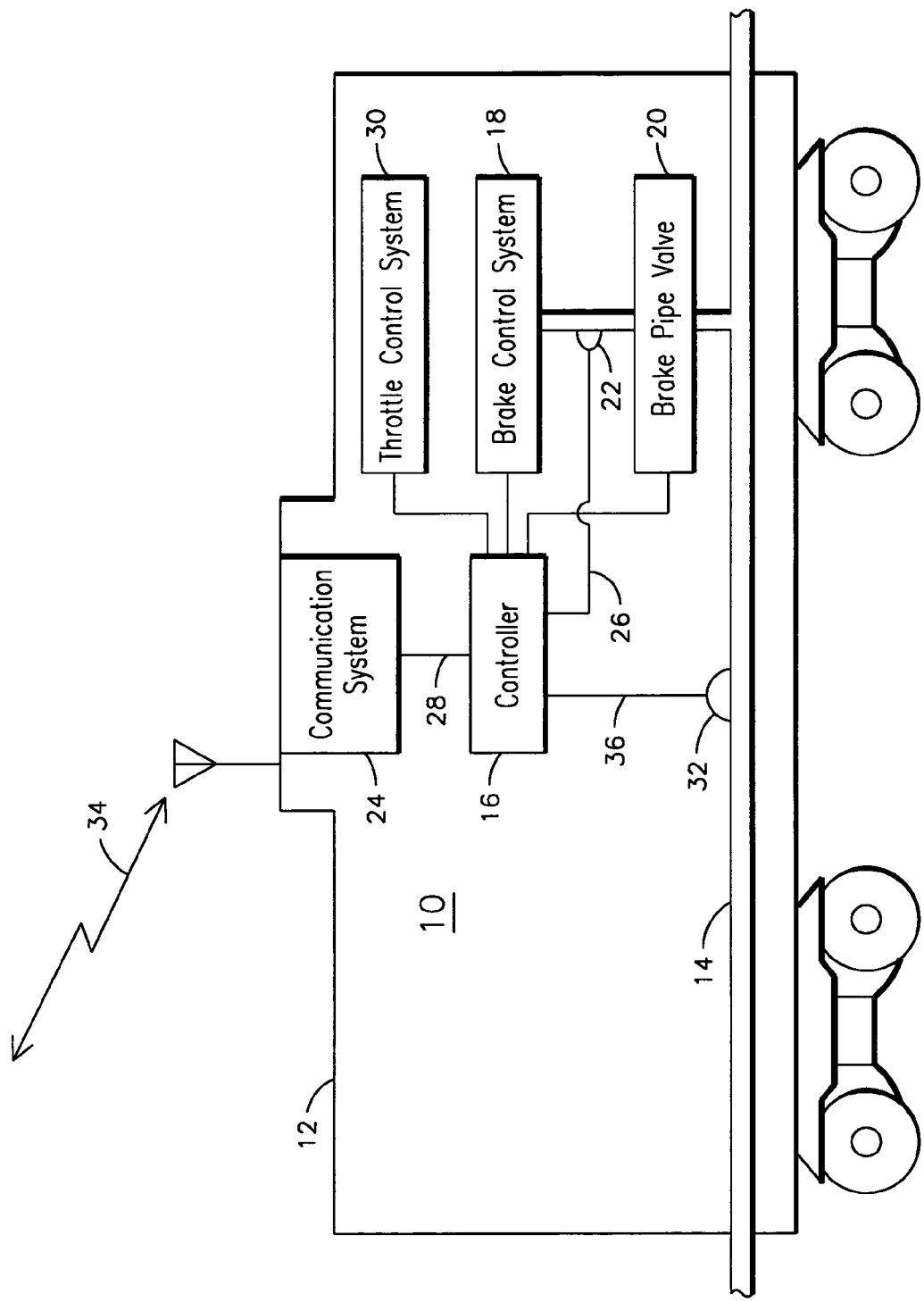

DISTRIBUTED POWER TRAIN OPERATION RESPONSIVE TO AN UNEXPECTED BRAKE PIPE FLUID FLOW CONDITION

FIELD OF THE INVENTION

This invention relates generally to the field of locomotive control, and more particularly to controlling an operation of a remote locomotive in a distributed power train responsive to an unexpected brake pipe fluid flow condition.

BACKGROUND OF THE INVENTION

Distributed power train operation supplies motive power from a lead locomotive and one or more remote locomotives spaced apart from the lead locomotive in a train consist. Each lead and remote locomotive includes an air brake control system for controlling braking operations and a communication system for exchanging information between lead and remote locomotives over a communication link. A brake pipe fluidically interconnects each of the locomotives and rail cars of the train wherein modulation of a fluid flow, such as a fluid pressure in the brake pipe, is conventionally used to indicate desired braking operations. Brake application is typically accomplished by venting, or reducing a pressure in the brake pipe. However, brake pipe venting at only the lead locomotive of a train requires propagation of the corresponding brake pipe pressure reduction along the length of the train, thus slowing brake application at rail cars and remote locomotives near the end of the train. In distributed power trains, braking is more effectively accomplished by venting a brake pipe at both the lead and remote locomotives of the train, thus accelerating the brake pipe venting and the application of brakes, throughout the train.

For distributed power trains with an operative communication link between a lead and remote locomotives, wireless traction and braking commands are typically transmitted to each remote unit over the link, such as when a train operator at the lead commands a brake application. For example, in response to a wireless brake application command, each remote locomotive also vents the brake pipe. Similarly, a brake release initiated at the lead is also communicated over the radio link, and each remote may respond by releasing its brakes and charging the brake pipe.

In the event that radio communication becomes inoperable in a distributed power train, a predetermined time period, such as 45 seconds, is typically allocated for attempting to re-establish wireless communications before a communication loss is declared. For example, a remote experiencing a potential communication loss may maintain a last-commanded traction and/or braking condition until the earliest of communications being re-established or the predetermined time period expiring. If the time period expires before communications are re-established, the remote may implement a fail safe mode of operation, such as disabling charging or venting of the brake pipe at the remote, and/or reducing a traction condition of the remote. During this time period the remote locomotive remains responsive to brake pipe fluid flow conditions sensed at the remote locomotive. For example, if a relatively small pressure drop in the brake pipe is sensed, the remote locomotive may interpret the drop as a slow leak and attempt to charge the brake pipe to return it to its previous pressure.

BRIEF DESCRIPTION OF THE DRAWINGS

The sole FIGURE is a schematic diagram of an exemplary system for automatically controlling operation of a remote locomotive of a distributed power railway train to propagate a brake pipe braking indication along the brake pipe.

DETAILED DESCRIPTION OF THE INVENTION

The present inventors have observed in a distributed power train that when an unexpected brake pipe fluid flow condition inconsistent with a last radio commanded braking operation is sensed by an upstream remote locomotive, the brake pipe flow condition may not be propagated to downstream remote locomotives. For example, a brake pipe brake fluid flow command corresponding to the lead locomotive commanding a minimum service brake application may be interpreted by a first remote locomotive sensing a pressure drop in the brake pipe as a leak. The first remote locomotive may then charge the brake pipe to correct for the leak, resulting in disruption of the minimum application pressure wave being propagated along the brake pipe to downstream remotes. Consequently, the downstream remotes may remain in a traction state and continue to charge the brake pipe despite a minimum service brake application indication being issued by the lead locomotive, leading to undesirable longer stopping distances and increased in train forces. Accordingly, the inventors have developed an innovative technique for controlling an operation of a first remote locomotive in a distributed power train responsive to an unexpected brake pipe fluid flow so that a brake pipe braking indication is propagated along the brake pipe to downstream second remote locomotive with reduced brake pipe fluid flow interference from the first remote locomotive.

The sole FIGURE is a schematic diagram of an exemplary system 10 for automatically controlling operation of a remote locomotive 12 of a distributed power train to propagate a brake pipe braking indication along the brake pipe 14. Advantageously, the system 10 propagates the brake pipe braking indication to a downstream remote locomotive with reduced brake pipe fluid flow interference from the remote locomotive 12. The system 10 may include a brake control system 18 in fluid communication with a brake pipe 14 via a brake pipe valve 20, wherein the brake control system 18 controls the brake pipe fluid flow at the remote locomotive 12. The brake pipe valve 20 is operable to disable the remote locomotive 12 from controlling a brake pipe flow, such as be interrupting a fluid communication between the brake control system 18 and the brake pipe 14. Accordingly, the brake pipe valve 20 may be operable to prevent or allow charging and venting of the brake pipe at the remote locomotive 12. The system 10 may also include a communication system 24, such as a wireless communication system for receiving commands issued by a lead locomotive via communication link 34.

In an aspect of the invention, the system 10 includes a controller 16 receiving a fluid flow signal 26 from a fluid flow sensor 22 and/or receiving a fluid pressure signal 36 for a fluid pressure sensor 32. The fluid flow sensor 22 monitors a condition of the brake pipe fluid flow, such as fluid flow into the brake pipe 14 at the remote locomotive 12, and generates a fluid flow signal 26 responsive to a sensed fluid flow condition. The fluid pressure sensor 32 may monitor a condition of brake pipe fluid pressure, such as fluid pressure in the brake pipe 14 at the remote locomotive 12, and generates the fluid pressure signal 36 responsive to a sensed fluid pressure condition. In an embodiment of the invention, the controller 16 controls an operation of the brake pipe valve 20 responsive to a condition of the brake pipe fluid flow indicated by the fluid flow signal 26 and/or the fluid pressure signal 36. Controller 16 may take any form known in the art, for example an analog or digital microprocessor or computer, and it may be integrated into or combined with one or more controllers used for other functions related to the operation of the remote locomotive 12. The controller 16 may control an operation of a throttle control system 30, for example, responsive to the fluid flow signal 26 or fluid pressure signal 36. The controller 16 may also receive a communication operability status signal 28 from the communication system 24 indicating whether or not the wireless link is operable for communicating with the lead locomotive for receiving traction and or braking commands. The controller 16 may control the throttle control system 30 and/or brake pipe valve 20 responsive to the status signal 28.

In an aspect of the invention, the controller 16 may be configured for implementing steps for controlling the operations of the remote locomotive, such systems 20, 30 responsive to various inputs, such as signals 26, 28, or 36. The steps necessary for such processes may be embodied in hardware, software and/or firmware in any form that is accessible and executable by controller 16 and may be stored on any medium that is convenient for the particular application. In an embodiment, the controller 16 may be configured for identifying a brake pipe fluid condition at the remote locomotive 12 inconsistent with a radio braking command issued by the lead locomotive and last received by the remote locomotive 12. For example, if a last received radio command indicated a brake release, but the present fluid flow signal 26 and/or fluid pressure signal 36 indicates a drop in pressure in the brake pipe 14, the controller 16 identifies this condition as a brake pipe fluid condition inconsistent with the latest radio comment, or an unexpected brake pipe fluid flow condition. After identifying an unexpected brake pipe fluid flow condition, the controller 16 may be configured for disabling an ability of the remote locomotive 12 to control a brake pipe flow. For example, instead of waiting for a communication operability check to be performed as is conventionally done, the controller 16 disables the remote locomotive 12 from charging or venting the brake pipe 14 without waiting for a communication check, so that the unexpected brake fluid flow condition, which may be a brake application indication, is propagated to downstream remote locomotives without interference. In an aspect of the invention, disabling may include closing the remote locomotive's brake pipe valve 20 to prevent the brake control system 18 of the remote locomotive 12 from charging or venting the brake pipe 14. In addition to disabling an ability of the remote locomotive 12 to control a brake pipe flow responsive to the unexpected brake pipe fluid flow condition, the controller 16 may be configured for reducing a traction condition of the remote locomotive 12, such as idling the remote locomotive 12, and/or disabling the remote locomotive 12 from responding to traction control radio commands issued by the lead locomotive. For example, the controller 16 may command the throttle control system 30 to place the remote locomotive 12 in an idle mode so that the remote locomotive 12 provides no motive power to the train.

After disabling an ability of the remote locomotive 12 to control a brake pipe flow, the controller 16 may be further configured for checking if communications with the lead locomotive are operative, such as by monitoring the communication status signal 28 provided by the communication system 24. If the communication check indicates inoperable radio communications with the lead locomotive, the controller 16 may be configured to reduce the traction condition of the remote locomotive 12 to idle and/or disable the remote locomotive 12 from responding to traction control radio commands issued by the lead locomotive. If the communication check indicates operable radio communications with the lead locomotive, the controller 16 may be configured to continue allowing the remote locomotive 12 to respond to traction control radio commands issued by the lead locomotive.

In another embodiment, when the communication check indicates operable radio communications with the lead locomotive, the controller 16 may be configured for re-enabling an ability of the remote locomotive 12 to control a brake pipe fluid flow, such as by opening the brake pipe valve 20 to allow the remote locomotive 12 to charge and vent the brake pipe 14. This step may be performed when the remote locomotive 12 is in a brake release state when the unexpected fluid flow condition is sensed. In another aspect, re-enabling of an ability to control a brake pipe flow may be implemented by the controller 16 after a brake release wireless command is received by the remote locomotive and/or followed by a predetermined brake pipe pressure rise in the brake pipe fluid flow, such as about 3 pounds per square inch (psi).

In another embodiment, when the remote locomotive 12 is in a brake application state when an unexpected fluid flow condition is detected and a subsequent communication check indicates operable radio communications with the lead locomotive, the controller 16 may be configured to continue allowing the first remote locomotive 12 to respond to wireless traction control radio commands issued by the lead locomotive. Additionally, when a wireless brake release command is received at the remote locomotive 12, the controller 16 may re-enable an ability of the remote locomotive 12 to control a brake pipe flow, such as after predetermined brake pipe pressure rise is sensed.

In yet another embodiment, an adaptive brake pipe valve control method may be implemented by the controller 16 when the remote 12 is in a brake release state when an unexpected brake pipe fluid flow condition is sensed. The method may include identifying an unexpected fluid flow condition and performing a communication check with the lead locomotive. When the communication check indicates a loss of communication with the lead locomotive and a sensed brake pipe pressure at the remote locomotive drops below a predetermined level for a predetermined amount of time, the remote locomotive 16 may be instructed to apply its brakes, such as implementing a minimum brake application. In an exemplary embodiment, the predetermined level may about 0.5 psi, and the predetermined period may be about 2 seconds. The method may further include reducing a traction condition of the remote locomotive 12, such as idling the locomotive 12 and/or disabling brake pipe control, such as by closing the brake pipe valve 20 of the remote locomotive 12.

In another exemplary embodiment, when a communication check indicates a loss of communication with the lead locomotive after an unexpected fluid flow has been sensed at the remote locomotive 12, the method may include reducing a traction condition of first remote locomotive 12 when the unexpected sensed brake pipe pressure remains within a predetermined limit for a predetermined amount of time. For example, this method may be implemented when an unexpected pressure drop of less than about 0.5 psi occurs for about 2 seconds. The method may further include disabling an ability of the remote locomotive to control a flow in the brake pipe 14 and/or disabling the remote 12 from responding to traction and/or braking wireless commands issue by the lead locomotive.

Based on the foregoing specification, the invention may be implemented using computer programming or engineering techniques including computer software, firmware, hardware or any combination or subset thereof, wherein the technical effect is to propagate a brake pipe braking indication responsive to a braking operation of a lead locomotive along the brake pipe from a first remote locomotive to a second remote locomotive downstream of the first remote locomotive. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. For example, the method and system described herein may be applied to any transportation system comprising members interconnected by a fluidic brake pipe and a communication system for exchanging information between a controlling member of the system and controlled members of the system, such as a train, a semi-truck with trailers, etc. Furthermore, the communication system may include a wired, wireless, satellite, electronic, infrared, etc. system for transmitting and receiving commands including braking commands. Accordingly, it is intended that the invention be limited only by the spirit and scope of the appended claims.

I claim:

1. In a railroad train comprising a fluid carrying brake pipe connecting a lead locomotive and a plurality of remote locomotives, further comprising a communication system for use by the lead locomotive to issue communication system commands to the remote locomotives, wherein the lead locomotive and the remote locomotives comprise a brake control system in fluid communication with the brake pipe via a brake pipe valve, wherein the brake control system at each of the lead and remote locomotives controls the brake pipe fluid flow, a method of propagating a brake pipe braking command responsive to a braking operation of the lead locomotive along the brake pipe from a first remote locomotive to a second remote locomotive downstream of the first remote locomotive comprising:

propagating a minimum application pressure wave from the lead locomotive to each remote locomotive of the plurality of remote locomotives along the brake pipe;

identifying, at the first remote locomotive, an unexpected brake pipe fluid flow condition inconsistent with a communication system braking command issued by the lead locomotive and last received by the first remote locomotive;

disabling an ability of the first remote locomotive to control a brake pipe flow so that minimum application pressure wave is propagated along the brake pipe to the second remote locomotive with reduced brake pipe fluid flow interference from the first remote locomotive; performing, at the first remote locomotive, a communication system communication check with the lead locomotive after disabling the ability of the first remote locomotive to control the brake pipe flow; and when the communication check indicates operable communications with the lead locomotive, continuing to allow the first remote locomotive to respond to traction control communication system commands issued by the lead locomotive when the first remote locomotive has been previously disabled from responding to traction commands.

2. The method of claim 1, wherein disabling comprises closing a brake pipe valve of the first remote locomotive.

3. The method of claim 1, further comprising reducing a traction condition of the first remote locomotive.

4. The method of claim 3, wherein reducing the traction condition comprises setting the traction condition of the first remote locomotive to an idle state so that the first remote locomotive provides no motive power to the train.

5. The method of claim 3, further comprising disabling the first remote locomotive from responding to traction control communication system commands issued by the lead locomotive.

6. The method of claim 1, further comprising, when the communication check indicates operable communications with the lead locomotive, re-enabling an ability of the first remote locomotive to control brake pipe flow after a brake release communication system command from the lead locomotive is received by the first remote locomotive.

7. The method of claim 6, wherein re-enabling is postponed until after the brake release command is received by the first remote locomotive and a predetermined brake pipe pressure rise is sensed by the first remote locomotive.

8. The method of claim 1, further comprising, when the communication check indicates operable communications with the lead locomotive and the first remote locomotive is in a brake application state when the unexpected fluid flow condition was sensed, continuing to allow the first remote locomotive to respond to traction control communication system commands issued by the lead locomotive.

9. The method of claim 8, further comprising re-enabling an ability of the first remote locomotive to control a brake pipe flow.

10. The method of claim 1, further comprising, when the communication check indicates operable communications with the lead locomotive and the first remote locomotive is in a brake release state when the unexpected fluid flow condition was sensed, re-enabling an ability of the first remote locomotive to control a brake pipe flow after a brake release communication system command is received by the first remote locomotive.

11. In a railroad train comprising a fluid carrying brake pipe connecting a lead locomotive and a plurality of remote locomotives, further comprising a communication system for use by the lead locomotive to issue communication system commands to the remote locomotives, wherein the lead locomotive and the remote locomotives comprise a brake control system in fluid communication with the brake pipe via a brake pipe valve, wherein the brake control system at each of the lead and remote locomotives controls the brake pipe fluid flow, a method of propagating a brake pipe braking command responsive to a braking operation of the lead locomotive along the brake pipe from the first remote locomotive to a second remote locomotive downstream of the first remote locomotive comprising:

propagating a minimum application pressure wave from the lead locomotive to each remote locomotive of the plurality of remote locomotives along the brake pipe;

identifying, when the first remote locomotive's brakes are in a released state, a brake pipe flow condition at the first remote locomotive inconsistent with a communication system braking command issued by the lead locomotive and last received by the first locomotive;

performing, at the first remote locomotive, a communication system communication check with the lead locomotive;

when the communication check indicates a loss of communication with the lead locomotive and a sensed brake pipe pressure at the remote locomotive drops below a predetermined level for a predetermined amount of time, applying the brakes of the first remote locomotive; and disabling an ability of the first remote locomotive to control a brake pipe flow so that the minimum application pressure wave from the lead locomotive is propagated along the brake pipe to a second remote locomotive with reduced brake pipe fluid flow interference from the first remote locomotive.

12. The method of claim 11, wherein disabling comprises closing the first remote locomotive's brake pipe control valve.

13. The method of claim 11, further comprising reducing a traction condition of the first remote locomotive.

14. The method of claim 13, wherein reducing a traction condition comprises setting the traction condition of the locomotive to an idle state so that the first locomotive provides no motive power to the train.

15. The method of claim 11, wherein when a sensed brake pipe pressure at the remote locomotive remains within a predetermined limit for a predetermined amount of time, reducing a traction condition of the first remote locomotive.

16. In a railroad train comprising a fluid carrying brake pipe connecting a lead locomotive and a plurality of remote locomotives, further comprising a communication system for use by the lead locomotive to issue communication system commands to the remote locomotives, wherein the lead locomotive and the remote locomotives each comprise a brake control system in fluid communication with the brake pipe via a brake pipe valve, wherein the brake control system at each of the lead and remote locomotives controls the brake pipe fluid flow, a system for propagating a brake pipe braking command responsive to a braking operation of the lead locomotive along the brake pipe from a first remote locomotive to a second remote locomotive downstream of the first remote locomotive comprising:

a fluid flow condition sensor at the first remote locomotive for sensing a fluid flow condition in the brake pipe at the first remote locomotive and for providing a fluid flow condition signal representative of a sensed fluid condition;

a brake pipe valve operable for disabling the first remote locomotive from controlling a brake pipe fluid flow condition; and a controller for operating the brake pipe valve responsive to the fluid flow condition signal being indicative of a brake pipe braking command to disable the first remote locomotive from controlling a brake pipe fluid flow condition so that a minimum application pressure wave is propagated along the brake pipe to the second remote locomotive downstream of the first remote locomotive with reduced brake pipe fluid flow interference from the first remote locomotive;

wherein the controller further determines a loss of communication with the lead locomotive and the brakes on the first remote locomotive are applied when the fluid flow condition sensor provides a reading below a predetermined level for a predetermined amount of time.

17. The system of claim 16, wherein the communication system provides a status signal indicative of the operability of the communication systems to the controller.

18. The system of claim 16, wherein the controller is further configured for reducing a traction condition of the locomotive responsive to the brake pipe braking command.

19. The system of claim 16, wherein the controller is further configured for disabling the first remote locomotive from responding to traction control communication system commands issued by the lead locomotive responsive to the brake pipe braking indication.

20. The system of claim 16, wherein the controller is further configured for operating the brake pipe valve to disable the first remote locomotive before determining an operability of the communication system.

21. The system of claim 16, wherein the fluid flow condition sensor comprises a flow sensor providing a fluid flow condition signal representative of a sensed brake pipe fluid flow.

22. The system of claim 16, wherein the fluid flow condition sensor comprises a pressure sensor providing a fluid flow condition signal representative of a sensed brake pipe fluid pressure.

23. A method of propagating a brake pipe braking command along a fluid carrying brake pipe interconnecting members of a transportation system, the transportation system comprising a communication system for exchanging information between a controlling member of the system and controlled members of the system, the method comprising:

propagating a minimum application pressure wave from the lead locomotive to each remote locomotive of the plurality of remote locomotives along the brake pipe identifying an unexpected brake pipe fluid flow condition at a first controlled member of a transportation system inconsistent with a communication system braking command issued by the controlling member of the transportation system; and disabling an ability of the first controlled member to control a brake pipe flow so that the minimum application pressure wave is propagated along a brake pipe to a second controlled member of the transportation system downstream of the first controlled member with reduced brake pipe fluid flow interference from the first controlled member;

performing, at the first controlled member, a communication system communication check with the controlling member after disabling the ability of the first controlled member to control the brake pipe flow; and when the communication check indicates operable communications with the controlling member, continuing to allow the first controlled member to respond to traction control communication system commands issued by the controlling member when the first controlled member has been previously disabled from responding to traction commands.

* * * * *